(12) United States Patent
Chen et al.

(10) Patent No.: US 10,833,296 B2
(45) Date of Patent: Nov. 10, 2020

(54) THIN FILM SOLID-STATE MICROBATTERY PACKAGING

(71) Applicant: International Business Machines Corporation, Armonk, NY (US)

(72) Inventors: Qianwen Chen, Yorktown Heights, NY (US); Bing Dang, Chappaqua, NY (US); John Knickerbocker, Monroe, NY (US); Bo Wen, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 226 days.

(21) Appl. No.: 15/715,722

(22) Filed: Sep. 26, 2017

(65) Prior Publication Data

US 2019/0097182 A1    Mar. 28, 2019

(51) Int. Cl.
| | |
|---|---|
| *H01M 2/02* | (2006.01) |
| *H01M 10/0525* | (2010.01) |
| *H01M 10/0565* | (2010.01) |
| *H01M 10/0562* | (2010.01) |
| *H01M 10/04* | (2006.01) |
| *H01M 6/40* | (2006.01) |

(Continued)

(52) U.S. Cl.
CPC ......... *H01M 2/026* (2013.01); *H01M 2/0207* (2013.01); *H01M 2/0267* (2013.01); *H01M 2/0277* (2013.01); *H01M 2/08* (2013.01); *H01M 2/1022* (2013.01); *H01M 6/18* (2013.01); *H01M 6/40* (2013.01); *H01M 10/049* (2013.01); *H01M 10/0436* (2013.01); *H01M 10/0525* (2013.01); *H01M 10/0562* (2013.01); *H01M 10/0565* (2013.01)

(58) Field of Classification Search
None
See application file for complete search history.

(56) References Cited

U.S. PATENT DOCUMENTS

| | | |
|---|---|---|
| 8,056,222 B2 | 11/2011 | Pique et al. |
| 9,425,451 B2 | 8/2016 | Yeh et al. |

(Continued)

FOREIGN PATENT DOCUMENTS

| | | |
|---|---|---|
| CN | 202601793 U | 12/2012 |
| CN | 104241693 A | 12/2014 |

(Continued)

OTHER PUBLICATIONS

List of IBM Patents or Applications Treated as Related.

(Continued)

*Primary Examiner* — Haixia Zhang
(74) *Attorney, Agent, or Firm* — Amin, Turocy & Watson, LLP

(57) ABSTRACT

Systems and/or techniques associated with a solid-state microbattery packaging system are provided. In one example, a device comprises a substrate layer and a tape substrate layer. The substrate layer is associated with a set of solid-state microbattery components. The tape substrate comprises a releasable adhesive material and a polymer sealing material. A conductive surface associated with the set of solid-state microbattery components is disposed on the releasable adhesive material of the tape substrate layer.

6 Claims, 12 Drawing Sheets

(51) Int. Cl.
*H01M 6/18* (2006.01)
*H01M 2/10* (2006.01)
*H01M 2/08* (2006.01)

(56) References Cited

U.S. PATENT DOCUMENTS

2008/0003492 A1\* 1/2008 Bates ................. H01M 2/0207
429/66
2008/0199781 A1   8/2008 Lunt et al.
2014/0287294 A1   9/2014 Lee et al.
2017/0072512 A1   3/2017 Umehara et al.
2017/0111994 A1\* 4/2017 Bedjaoui ................ H01L 23/04

FOREIGN PATENT DOCUMENTS

DE    102010029060 A1   11/2011
DE    10-2014209263 A   11/2015
KR    1020160023072 A    3/2016
WO       2016046452 A1   3/2016

OTHER PUBLICATIONS

Non-Final Office Action received for U.S. Appl. No. 15/841,720 dated Jan. 22, 2020, 84 pages.
Final Office Action received for U.S. Appl. No. 15/841,720 dated Jul. 8, 2020, 20 pages.

\* cited by examiner

THIN FILM SOLID-STATE MICROBATTERY PACKAGING

BACKGROUND

The subject disclosure relates to microbattery systems, and more specifically, to solid-state microbattery packaging systems.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, methods, apparatuses and/or devices that facilitate improved solid-state microbattery packaging are described.

According to an embodiment, a system can comprise a substrate layer and a tape substrate layer. The substrate layer can be associated with a set of solid-state microbattery components. The tape substrate layer can comprises a releasable adhesive material and a polymer sealing material. A conductive surface associated with the set of solid-state microbattery components can be disposed on the releasable adhesive material of the tape substrate layer.

According to another embodiment, a method is provided. The method can comprise attaching a set of solid-state microbattery components to a surface of a substrate layer that comprises a glass material. Furthermore, the method can comprise disposing a conductive surface associated with the set of solid-state microbattery components onto a tape substrate layer that comprises a releasable adhesive material. The method can also comprise separating the set of solid-state microbattery components via a laser release process that ablates and de-bonds an interface between the set of solid-state microbattery components and the tape substrate layer.

According to yet another embodiment, a packaged microbattery device can comprise a substrate layer, an adhesive layer, an insulator cap layer, and a hermetic coating layer. The substrate layer can comprise an insulator material. Furthermore, a microbattery can be formed on a surface of the substrate layer. The adhesive layer can comprise a releasable adhesive material. The insulator cap layer can be aligned and bonded onto the microbattery using the adhesive layer. The hermetic coating layer can couple the microbattery to the substrate layer.

DETAILED DESCRIPTION

Figure 1:
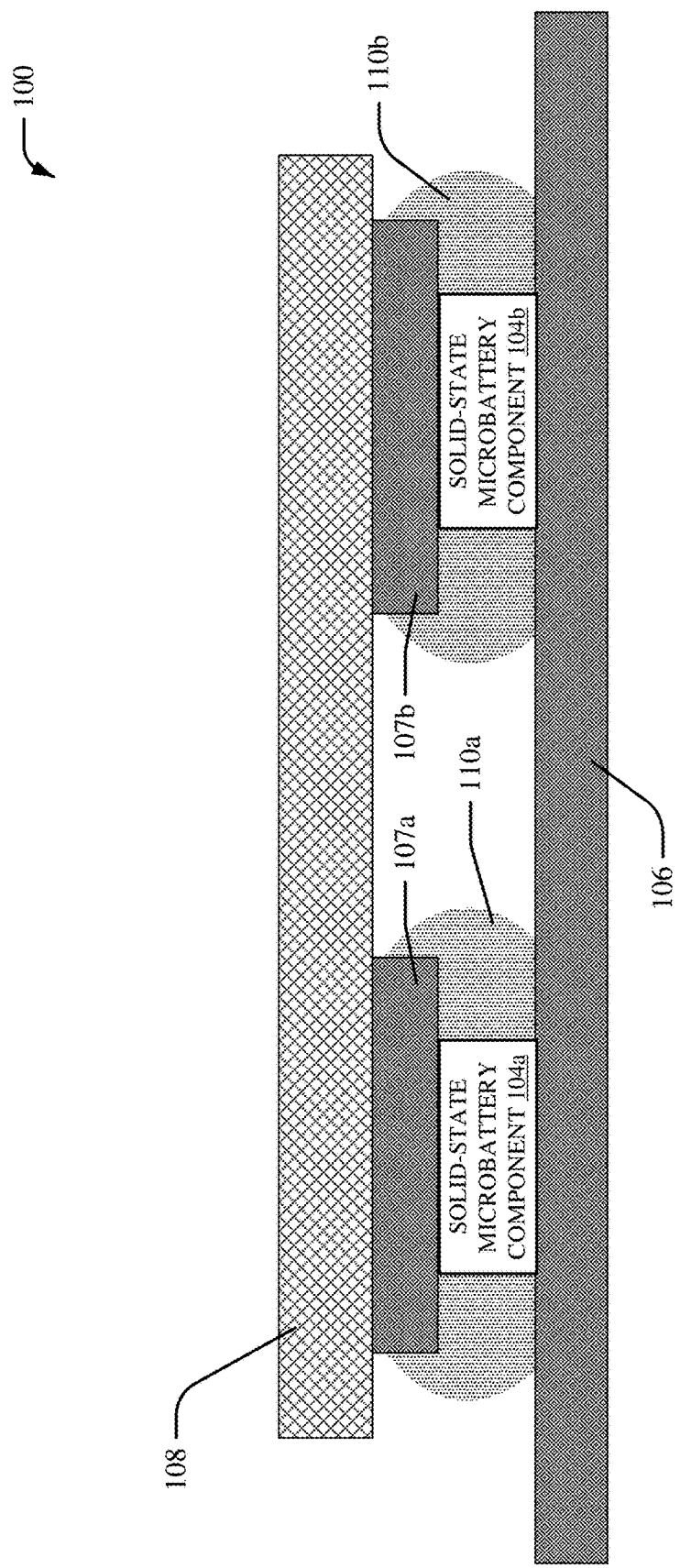
FIG. 1 illustrates a block diagram of an example, non-limiting system associated with a solid-state microbattery packaging in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A solid-state microbattery can comprise a solid-state electrolyte rather than a liquid electrolyte to allow an electrical charge to flow between an anode terminal and a cathode terminal of the solid-state microbattery. With recent advances in electronic technologies, solid-state microbatteries are becoming more common in electronic devices. However, batch processing and/or packaging of a large quantity of solid-state microbatteries to facilitate fabrication of solid-state microbatteries is often difficult and/or time consuming. Furthermore, singulation of solid-state microbatteries often leads to edge defects that allow air leaks in the solid-state batteries. Testing of numerous solid-state microbatteries is also difficult during fabrication, batch processing and/or packaging of the solid-state batteries.

Embodiments described herein include systems, methods, apparatuses and devices that facilitate improved packaging and/or testing of solid-state batteries. For example, novel solid-state microbattery packaging and/or novel solid-state microbattery testing can be provided. In an embodiment, a releasable adhesive material can be employed to provide improved handling, testing, singulation and/or packaging of solid-state batteries. In another embodiment, an overmold comprised of a polymer sealing material can be applied to seal packaging of solid-state batteries. In yet another embodiment, a tool can be employed to form an array of solid-state microbatteries that satisfy a defined criterion (e.g., an array of solid-state microbatteries that are determined to be functioning properly) on a releasable adhesive material. Additionally or alternatively, a releasable adhesive material can be employed to provide stacking of two or more solid-state batteries. In yet another embodiment, a releasable adhesive material can be employed to temporarily hold a set of cap wafers for a set of solid-state microbatteries to provide stress free bonding and/or sealing of the set of solid-state batteries. In yet another embodiment, a set of solid-state microbattery components are formed on a surface of a handler substrate layer. The handler substrate layer can be a tape or a glass with a releasable adhesive material. A conductive surface associated with the set of solid-state microbattery components can be disposed on the releasable adhesive material of the handler substrate layer. As such, solid-state microbattery packaging with a molding structure for hermetic or near hermetic packaging around a solid-state microbattery can be provided. Moreover, impact of laser cutting to an adhesive bond interface of solid-state microbattery packaging can be reduced in order to provide an air tight seal for the solid-state microbattery packaging. A batch process can also be improved by employing a releasable adhesive material to enable mass production of solid-state microbattery packaging. Furthermore, a releasable adhesive material can provide an ability to test numerous solid-state microbatteries in parallel. Protection of solid-state microbatteries within solid-state microbattery packaging and/or improved quality of solid-state microbatteries within solid-state microbattery packaging can also be provided.

FIG. 1 illustrates a block diagram of an example, non-limiting system 100 that facilitates improved solid-state microbattery packaging in accordance with one or more embodiments described herein. In various embodiments, the system 100 can be a solid-state microbattery packaging system. For example, the system 100 can be a thin film solid-state microbattery packaging system. The system 100 can employ a novel device (e.g., novel solid-state microbattery packaging and/or a novel solid-state microbattery device) that is highly technical in nature, that is not abstract and that cannot be created by a set of mental acts by a human. Further, the system 100 can be employed to solve new problems that arise through advancements in technology such as, for example, solid-state microbattery technologies, solid-state microbattery packaging technologies, circuit technologies, and/or computer architecture, and the like. One or more embodiments of the system 100 can provide technical improvements to a solid-state microbattery device by at least improving quality of a solid-state microbattery, improving adhesive sealing for a solid-state microbattery, providing a molding structure for hermetic or near hermetic packaging for one or more solid-state batteries, providing air tight sealing for one or more solid-state batteries, eliminating impact of laser cutting to an adhesive bond interface for one or more solid-state batteries, providing a batch process that enables mass production of solid-state batteries, and/or providing improved testing of numerous solid-state microbatteries in parallel.

In the embodiment shown in FIG. 1, the system 100 can include a solid-state microbattery component 104a, a solid-state microbattery component 104b, a substrate layer 106, a releasable handler layer 108, a cap wafer 107a, a cap wafer 107b, polymer sealing material 110a, and polymer sealing material 110b. In one example, the releasable handler layer 108, the polymer sealing material 110a and/or the polymer sealing material 110b can form an adhesive layer. The solid-state microbattery component 104a can include, for example, an anode, a cathode and/or a solid-state electrolyte that form a solid-state microbattery. Similarly, the solid-state microbattery component 104b can include, for example, an anode, a cathode and/or a solid-state electrolyte that form a solid-state microbattery. In one example, the solid-state microbattery component 104a and/or the solid-state microbattery component 104b can be a solid-state lithium microbattery component (e.g., a thin film solid-state lithium microbattery component). However, it is to be appreciated that the solid-state microbattery component 104a and/or the solid-state microbattery component 104b can be a different type of solid-state microbattery component. The substrate layer 106 can be, for example, a handler substrate layer that comprises an insulator material, a glass material or a silicon material. The releasable handler layer 108 can be, for example, an adhesive layer that is releasable from the cap wafer 107a and/or the cap wafer 107b. The polymer sealing material 110a can be, for example, a polymer adhesive that facilitates bonding between the cap wafer 107a and the substrate layer 106. For example, the polymer sealing material 110a can be a synthetic bonding substance comprised of polymers. The polymer sealing material 110a can also create an air-tight seal for the solid-state microbattery component 104a. For instance, the polymer sealing material 110a can be an overmold comprised of a polymer adhesive to facilitate sealing of the solid-state microbattery component 104a from an external environment (e.g., air surrounding solid-state microbattery packaging associated with the solid-state microbattery component 104a). Similarly, the polymer sealing material 110b can be, for example, a polymer adhesive that facilitates bonding between the cap wafer 107b and the substrate layer 106. For example, the polymer sealing material 110a can be a synthetic bonding substance comprised of polymers. The polymer sealing material 110b can also create an air-tight seal for the solid-state microbattery component 104b. For instance, the polymer sealing material 110b can be an overmold comprised of a polymer adhesive to facilitate sealing of the solid-state microbattery component 104b from an external environment (e.g., air surrounding solid-state microbattery packaging associated with the solid-state microbattery component 104b).

In an embodiment, the solid-state microbattery component 104a and the solid-state microbattery component 104b can be formed on the substrate layer 106. For example, a conductive surface of the solid-state microbattery component 104a and a conductive surface of the solid-state microbattery component 104b can be in contact with the substrate layer 106. Furthermore, the cap wafer 107a can be formed on the solid-state microbattery component 104a. The cap wafer 107a can be, for example, an insulator cap layer. The cap wafer 107a can be aligned and bonded onto the solid-state microbattery component 104a using the releasable handler layer 108 and/or the polymer sealing material 110a. In an aspect, the polymer sealing material 110a can be in contact with the solid-state microbattery component 104a, the substrate layer 106 and the cap wafer 107a. The solid-state microbattery component 104a can also be disposed within the polymer sealing material 110a. For instance, a first surface of the solid-state microbattery component 104a can be in contact with the substrate layer 106, a second surface of the solid-state microbattery component 104a can be in contact with the cap wafer 107a, a third surface of the solid-state microbattery component 104a can be in contact with the polymer sealing material 110a, and a fourth surface of the solid-state microbattery component 104a can be in contact with the polymer sealing material 110a. Similarly, the cap wafer 107b can be formed on the solid-state microbattery component 104b. The cap wafer 107b can be, for example, an insulator cap layer. The cap wafer 107b can be aligned and bonded onto the solid-state microbattery component 104b using the releasable handler layer 108 and/or the polymer sealing material 110b. In an aspect, the polymer sealing material 110b can be in contact with the solid-state microbattery component 104b, the substrate layer 106 and the cap wafer 107b. The solid-state microbattery component 104b can also be disposed within the polymer sealing material 110b. For instance, a first surface of the solid-state microbattery component 104b can be in contact with the substrate layer 106, a second surface of the solid-state microbattery component 104b can be in contact with the cap wafer 107b, a third surface of the solid-state microbattery component 104b can be in contact with the polymer sealing material 110b, and a fourth surface of the solid-state microbattery component 104b can be in contact with the polymer sealing material 110b. As such, the solid-state microbattery component 104a can be associated with a first portion of the polymer sealing material 110a that is separate from a second portion of the polymer sealing material 110b associated with the solid-state microbattery component 104b. It is to be appreciated that, in certain embodiments, the system 100 can include more than two solid-state microbattery component (e.g., one or more additional solid-state microbattery component than the solid-state microbattery component 104a and the solid-state microbattery component 104b).

The releasable handler layer 108 can be, for example, a handler substrate layer (e.g., an adhesive substrate layer, a tape substrate layer, etc.). The releasable handler layer 108 can be attached to the cap wafer 107a and the cap wafer 107b. Furthermore, the releasable handler layer 108 can be configured to be removable from the cap wafer 107a and the cap wafer 107b. In one example, the releasable handler layer 108 can comprise a pressure-sensitive tape. In another example, the releasable handler layer 108 be a dicing tape that comprises polyvinyl chloride, polyolefin, polyethylene or another adhesive material. However, it is to be appreciated that the releasable handler layer 108 can comprise a different type of releasable adhesive material. In an aspect, the releasable handler layer 108 can be a handler layer to facilitate handling of the cap wafer 107a, the cap wafer 107b, the polymer sealing material 110a and/or the polymer sealing material 110b. As such, the releasable handler layer 108 can facilitate improved batch transfer and/or bonding of the cap wafer 107a and the cap wafer 107b onto the solid-state microbattery component 104a and the solid-state microbattery component 104b. Furthermore, the releasable handler layer 108 can facilitate improved sealing for the solid-state microbattery component 104a and the solid-state microbattery component 104b. Furthermore, the releasable handler layer 108 can facilitate improved protection of the solid-state microbattery component 104a and the solid-state microbattery component 104b during a shipping process. In certain embodiments, the releasable handler layer 108 can be employed to stack two or more solid-state microbattery components. For example, the releasable handler layer 108 can be employed to stack the solid-state microbattery component 104a and the solid-state microbattery component 104b to form a stacked solid-state microbattery packaging. In one example, the solid-state microbattery component 104a and the solid-state microbattery component 104b can be stacked in a serial configuration using the releasable handler layer 108 to provide higher voltage capabilities. In another example, the solid-state microbattery component 104a and the solid-state microbattery component 104b can be stacked in a parallel configuration using the releasable handler layer 108 to provide higher capacity capabilities. In certain embodiments, a laser release process can separate the solid-state microbattery component 104a and the solid-state microbattery component 104b by cutting through the substrate layer 106 and/or the releasable handler layer 108 using a laser beam.

Figure 2:
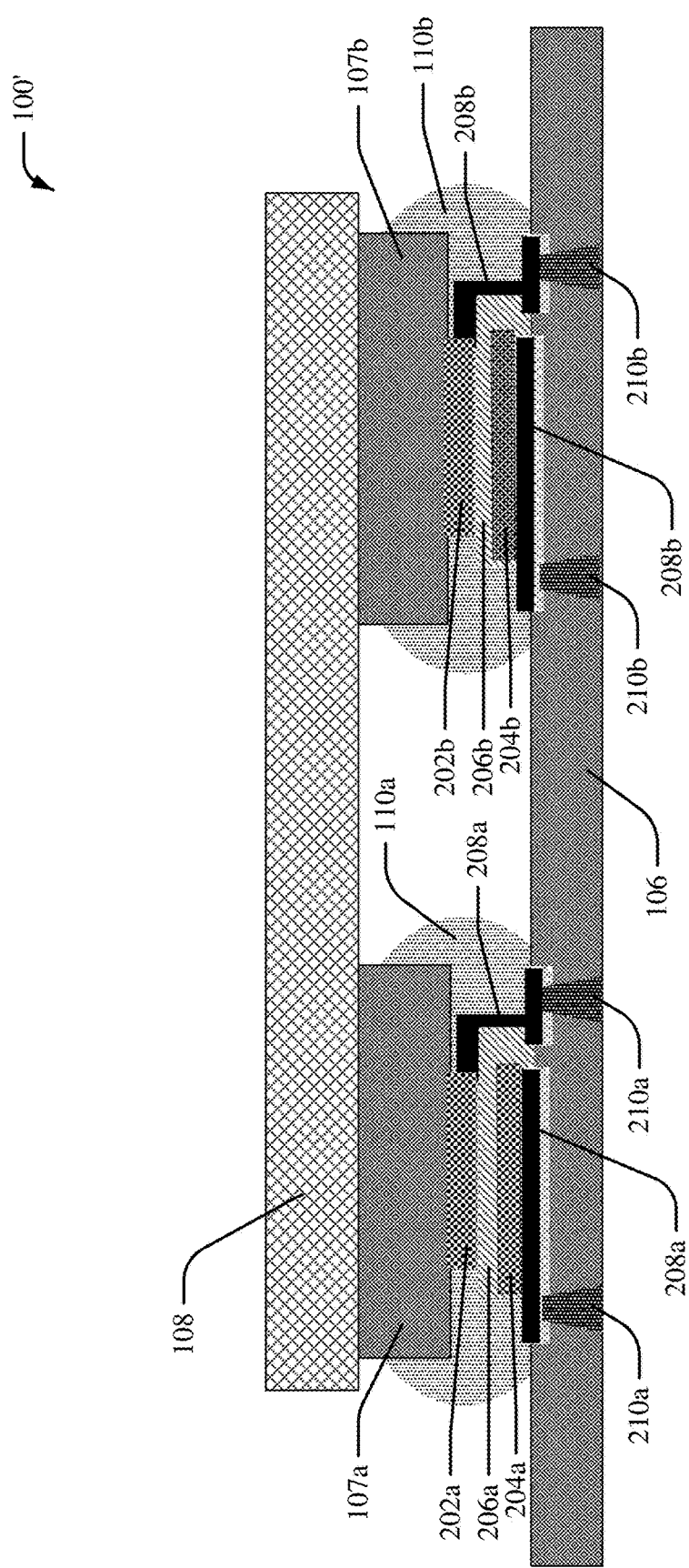
FIG. 2 illustrates a block diagram of another example, non-limiting system associated with a solid-state microbattery packaging in accordance with one or more embodiments described herein.

FIG. 2 illustrates a top view of an example, non-limiting system 100' in accordance with one or more embodiments described herein. Repetitive description of like elements employed in other embodiments described herein is omitted for sake of brevity.

The system 100' can be an alternate embodiment of the system 100. In the embodiment shown in FIG. 2, the solid state-microbattery component 104a can correspond to an anode 202a, a cathode 204a, a solid-state electrolyte 206a and/or one or more conductive traces 208a. The anode 202a can be an anode terminal for the solid-state microbattery component 104a. Furthermore, the cathode 204a can be a cathode terminal for the solid-state microbattery component 104a. The solid-state electrolyte 206a can be a solid-state electrolyte substance to allow an electrical charge to flow between the anode 202a and the cathode 204a of the solid-state microbattery component 104a. In an aspect, the anode 202a, the cathode 204a, and the solid-state electrolyte 206a can be disposed within the polymer sealing material 110a. The one or more conductive traces 208a can electrically couple the solid-state microbattery component 104a to the substrate layer 106 and/or one or more external devices. In an embodiment, the one or more conductive traces 208a can be coupled to one or more conductive terminals 210a formed in the substrate layer 106. Similarly, in the embodiment shown in FIG. 2, the solid state-microbattery component 104b can correspond to an anode 202b, a cathode 204b, a solid-state electrolyte 206b and/or one or more conductive traces 208b. The anode 202b can be an anode terminal for the solid-state microbattery component 104b. Furthermore, the cathode 204b can be a cathode terminal for the solid-state microbattery component 104b. The solid-state electrolyte 206b can be a solid-state electrolyte substance to allow an electrical charge to flow between the anode 202b and the cathode 204b of the solid-state microbattery component 104b. In an aspect, the anode 202b, the cathode 204b, and the solid-state electrolyte 206b can be disposed within the polymer sealing material 110b. The one or more conductive traces 208b can electrically couple the solid-state microbattery component 104b to the substrate layer 106 and/or one or more external devices. In an embodiment, the one or more conductive traces 208b can be coupled to one or more conductive terminals 210b formed in the substrate layer 106. In another embodiment, the cap wafer 107a can be disposed on the anode 202a and the cap wafer 107b can be disposed on the anode 202b.

Figure 3:
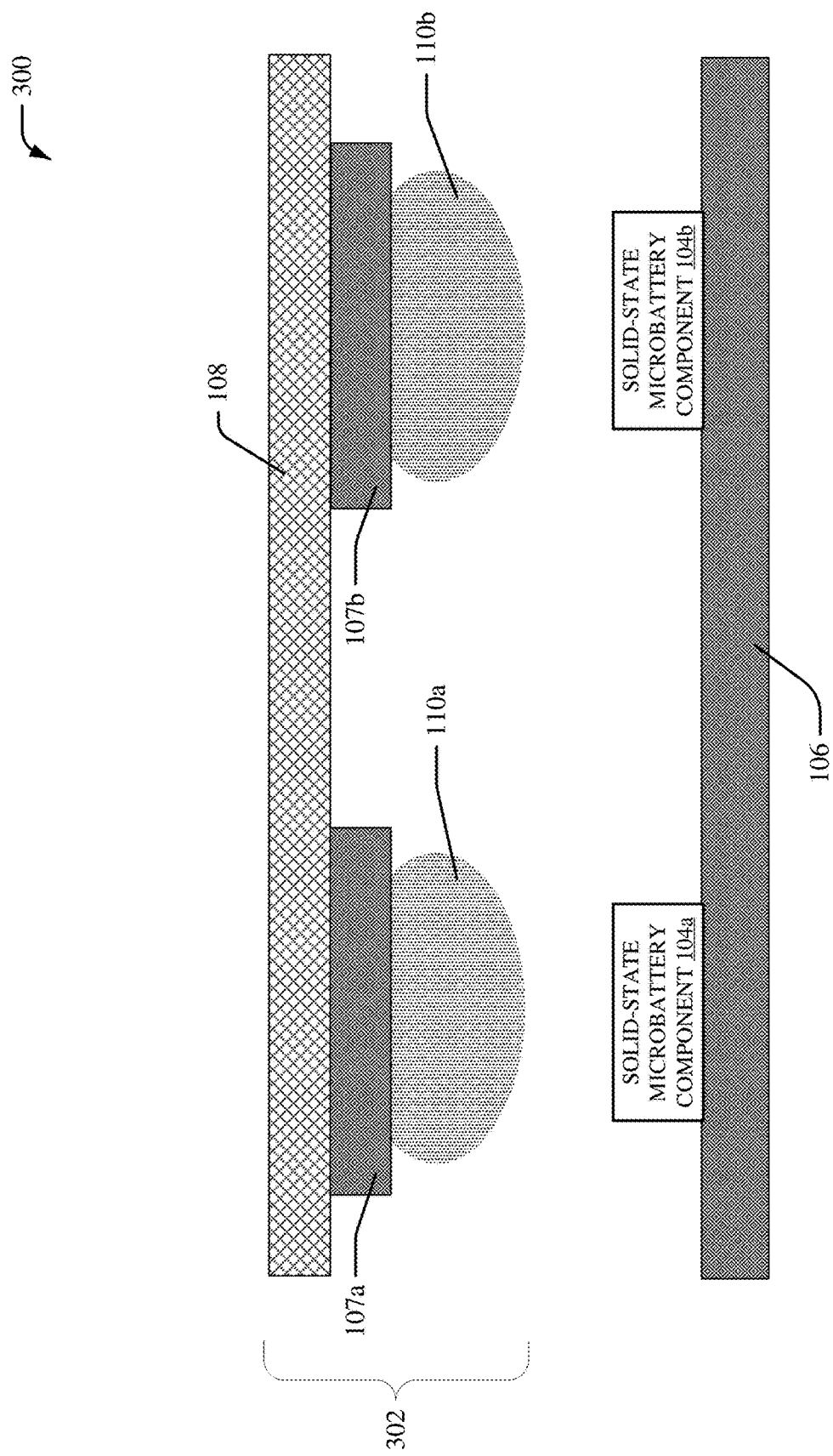
FIG. 3 illustrates a block diagram of yet another example, non-limiting system associated with a solid-state microbattery packaging in accordance with one or more embodiments described herein.

FIG. 3 illustrates a top view of an example, non-limiting system 300 in accordance with one or more embodiments described herein. Repetitive description of like elements employed in other embodiments described herein is omitted for sake of brevity.

The system 300 can be a solid-state microbattery packaging system. For example, the system 300 can be a thin film solid-state microbattery packaging system. The system 300 can include the substrate layer 106, the solid-state microbattery component 104*a*, the solid-state microbattery component 104*b*, and an adhesive layer 302. The adhesive layer 302 can be, for example, a tape substrate layer. The adhesive layer 302 can include the releasable handler layer 108, the cap wafer 107*a*, the cap wafer 107*b*, the polymer sealing material 110*a*, and the polymer sealing material 110*b*. A first surface of the cap wafer 107*a* and a first surface of the cap wafer 107*b* can be disposed on the releasable handler layer 108. Furthermore, the polymer sealing material 110*a* can be disposed on a second surface of the cap wafer 107*a* and the polymer sealing material 110*b* can be disposed on a second surface of the cap wafer 107*b*. The solid-state microbattery component 104*a* and the solid-state microbattery component 104*b* can be formed on a surface of the substrate layer 106. In an embodiment, the adhesive layer 302 can be bonded to the substrate layer 106 to form a solid-state microbattery packaging system (e.g., to form the system 100 shown in FIG. 1). For instance, the polymer sealing material 110*a* can be bonded to the solid-state microbattery component 104*a* and/or the substrate layer 106. Furthermore, the polymer sealing material 110*b* can be bonded to the solid-state microbattery component 104*b* and/or the substrate layer 106. In certain embodiments, the adhesive layer 302 can be bonded to the substrate layer 106 and cured in a vacuum environment. In an embodiment, the system 300 can provide improved batch processing and/or packaging of at least the solid-state microbattery component 104*a* and the solid-state microbattery component 104*b*.

Figure 4:
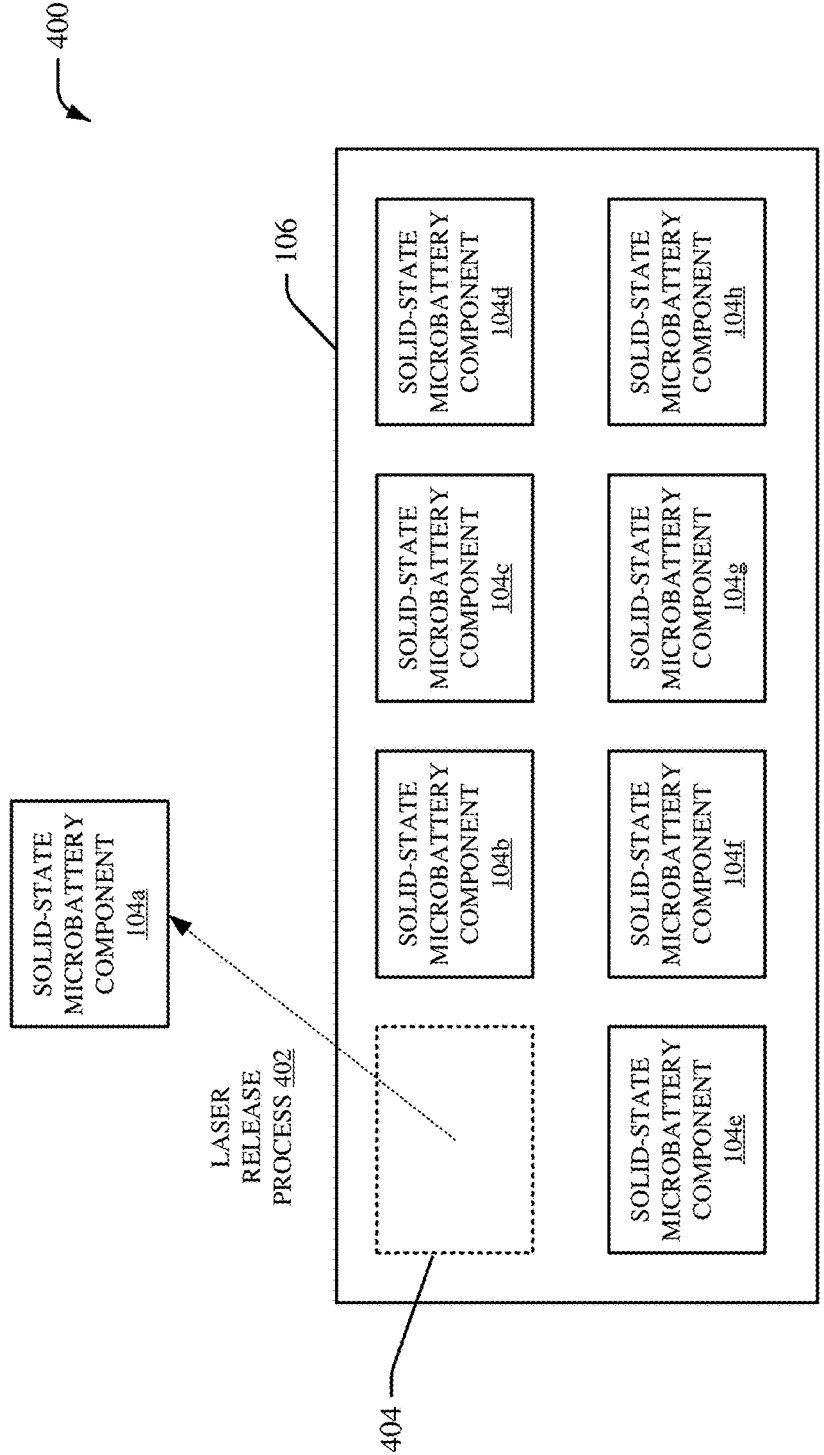
FIG. 4 illustrates a block diagram of an example, non-limiting system associated with a laser release process in accordance with one or more embodiments described herein.

FIG. 4 illustrates a top view of an example, non-limiting system 400 in accordance with one or more embodiments described herein. Repetitive description of like elements employed in other embodiments described herein is omitted for sake of brevity.

The system 400 can include the substrate layer 106 and solid-state microbattery components 104*a-h*. In an embodiment, a laser release process 402 can be performed to remove a solid-state microbattery component 104*a-h* (e.g., solid-state microbattery component 104) from the substrate layer 106. For instance, a portion 404 of the substrate layer 106 can be cut through via the laser release process 402 to facilitate removal of a solid-state microbattery component 104*a-h* (e.g., solid-state microbattery component 104) from the substrate layer 106. In certain embodiments, the releasable handler layer 108 and/or a releasable adhesive material can be employed to facilitate removal of a solid-state microbattery component (e.g., solid-state microbattery component 104*a*) from the substrate layer 106. For example, the solid-state microbattery components 104*a-h* can be disposed on a first surface of the substrate layer 106. Furthermore, the releasable handler layer 108 can be disposed on a second surface of the substrate layer 106. As such, in response to the portion 404 of the substrate layer 106 being cut via the laser release process 402, the substrate layer 106 can be turned over using the releasable handler layer 108 to allow the solid-state microbattery component 104*a* to be removed from the substrate layer 106. Alternatively, in response to the portion 404 of the substrate layer 106 being cut via the laser release process 402, the substrate layer 106 can be separated from the releasable handler layer 108 to allow the solid-state microbattery component 104*a* to be removed from the substrate layer 106 and/or the releasable handler layer 108. Furthermore, the laser release process 402 in combination with the substrate layer 106 and the releasable handler layer 108 can provide a reduced pick and place time for removing one or more solid-state microbattery components 104*a-h* that are not operating properly. In an embodiment, the laser release process 402 can be performed by a laser device that produces a laser beam to cut the portion 404 of the substrate layer 106. In another embodiment, the laser release process 402 can ablate and/or de-bonds an interface between one or more solid-state microbattery components 104*a-h* (e.g., solid-state microbattery component 104*a*, etc.) and the releasable adhesive layer 108. In yet another embodiment, the laser release process 402 can ablate and/or de-bonds an interface between the substrate layer 106 and the releasable adhesive layer 108.

Figure 5:
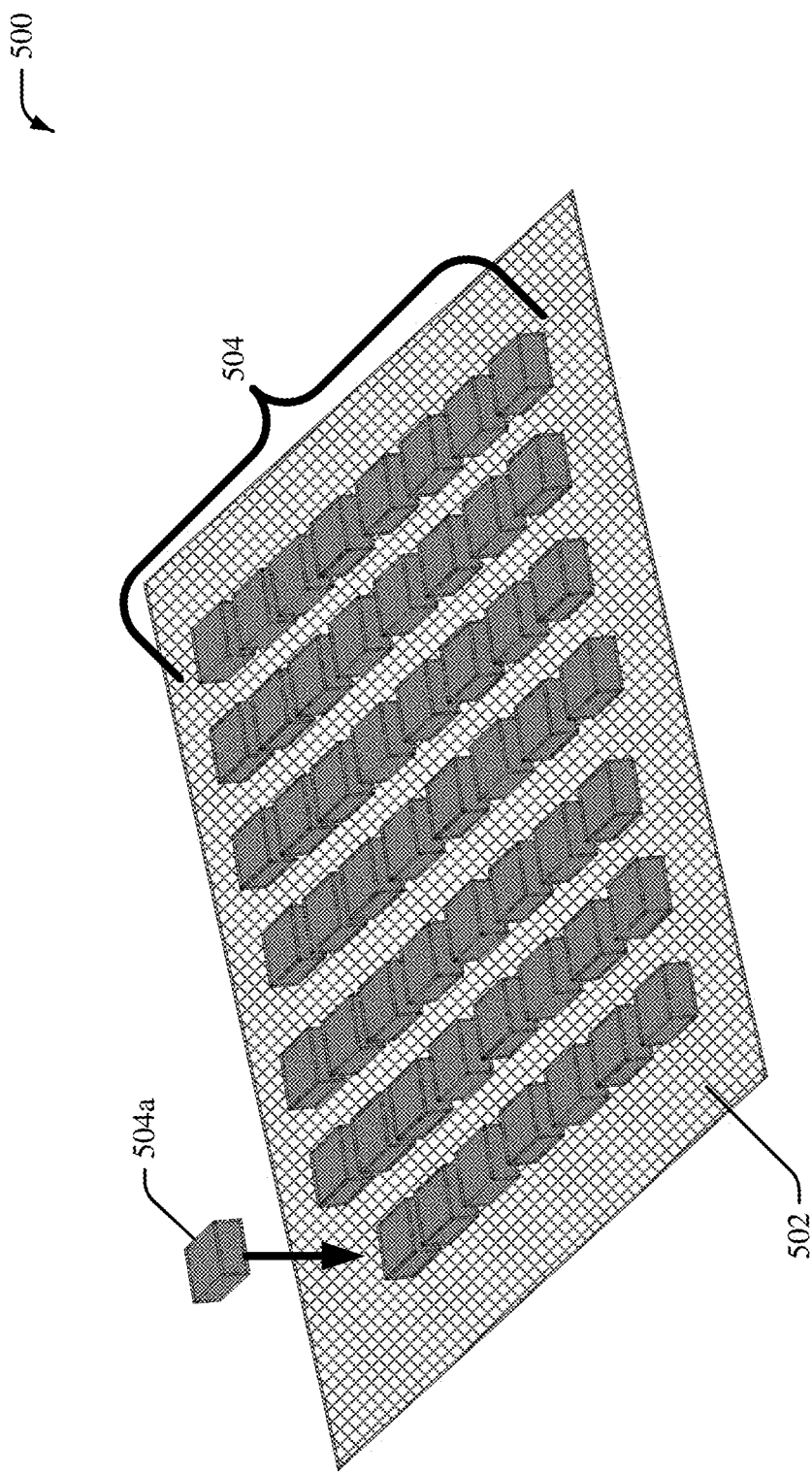
FIG. 5 illustrates a block diagram of an example, non-limiting system associated with an array of solid-state microbatteries in accordance with one or more embodiments described herein.

FIG. 5 illustrates a top view of an example, non-limiting system 500 in accordance with one or more embodiments described herein. Repetitive description of like elements employed in other embodiments described herein is omitted for sake of brevity.

The system 500 can include surface 502. In an embodiment, the surface 502 can be a releasable handler layer. For instance, the surface 502 can comprise a releasable adhesive material to facilitate addition and/or removal of solid-state microbattery components 504 from the surface 502 (e.g., from a releasable handler layer). In another embodiment, the surface 502 can be a substrate layer. For instance, the surface 502 can comprise an insulator material, a glass material, or a silicon material to facilitate addition and/or removal of solid-state microbattery components 504 from the surface 502 (e.g., from a substrate layer). In an aspect, a solid-state microbattery component 504*a* from the solid-state microbattery components 504 can be added to the surface 502. For example, a solid-state microbattery component 504*a* from the solid-state microbattery components 504 can be added to a releasable handler layer or a substrate layer. Alternatively, the solid-state microbattery component 504*a* from the solid-state microbattery components 504 can be removed from the surface 502. For example, the solid-state microbattery component 504*a* from the solid-state microbattery components 504 can be removed from a releasable handler layer or a substrate layer. As such, a solid-state microbattery component (e.g., solid-state microbattery component 504*a*) from the solid-state microbattery components 504 can be individually removable from the surface 502 (e.g., individually removable from a releasable handler layer or a substrate layer). In an aspect, the solid-state microbattery components 504 can be arranged as an array of solid-state microbattery components on the surface 502. For example, the solid-state microbattery components 504 can be arranged as an array of solid-state microbattery components on a releasable handler layer or a substrate layer. In certain embodiments, the solid-state microbattery components 504 can be tested while disposed on the surface 502. In one example, a precision pick and place tool can be employed to test the solid-state microbattery components 504 disposed on the surface. In another example, more than one solid-state microbattery component from the solid-state microbattery components 504 can be concurrently tested while disposed on the surface 502.

Figure 6A:
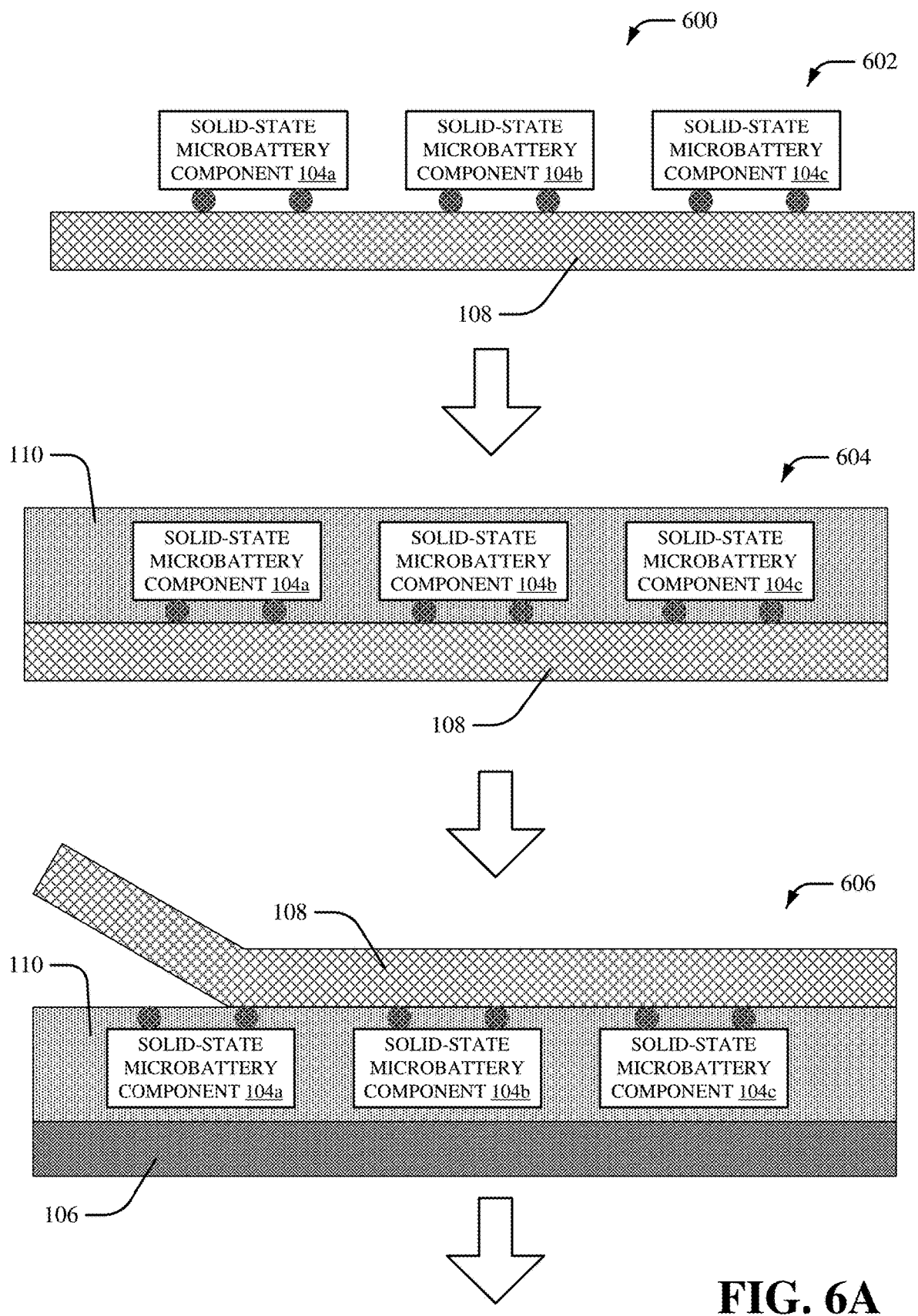
FIG. 6A illustrates a block diagram of an example, non-limiting process associated with fabricating solid-state microbattery packaging in accordance with one or more embodiments described herein.
Figure 6B:
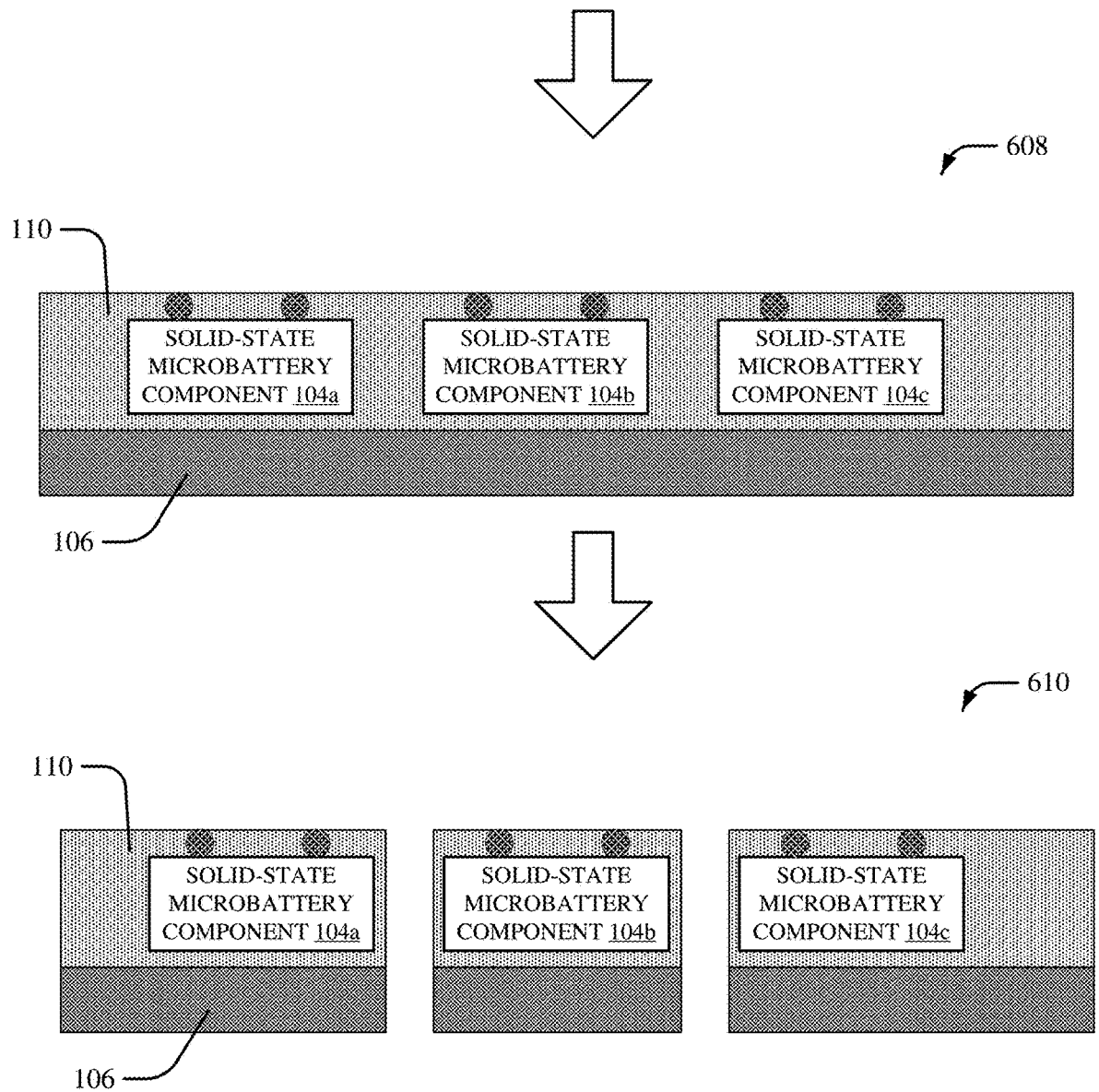
FIG. 6B also illustrates a block diagram of an example, non-limiting process associated with fabricating solid-state microbattery packaging in accordance with one or more embodiments described herein.

FIG. 6A and FIG. 6B pictorially depict an example process 600 for fabricating a solid-state microbattery packaging system in accordance with one or more embodiments described herein. Repetitive description of like elements employed in other embodiments described herein is omitted for sake of brevity.

With reference to FIG. 6A, presented is a device structure step 602 that includes the releasable handler layer 108 and solid-state microbattery components 104a-c. The solid-state microbattery components 104a-c can be formed on a surface of the releasable handler layer 108. For example, an anode, a cathode and/or solid-state electrolyte of the solid-state microbattery components 104a-c can be formed on the releasable handler layer 108. In one example, the solid-state microbattery components 104a-c can be deposited on the releasable handler layer 108. For instance, a structure that comprises an anode, a cathode and/or solid-state electrolyte can be deposited on the releasable handler layer 108. In an embodiment, electrical terminals of the solid-state microbattery components 104a-c can be attached to the surface of the releasable handler layer 108.

At a device structure step 604, polymer sealing material 110 can be disposed on the solid-state microbattery components 104a-c and the releasable handler layer 108. For instance, the polymer sealing material 110 can surround the solid-state microbattery components 104a-c and can be deposited on the surface of the releasable handler layer 108.

At a device structure step 606, the solid-state microbattery components 104a-c, the releasable handler layer 108 and the polymer sealing material 110 can be rotated. Furthermore, the polymer sealing material 110 can be disposed on a surface of the substrate layer 106. In an aspect, at least a portion of the releasable handler layer 108 can be removed from the polymer sealing material 110. For instance, at least a portion of the releasable handler layer 108 can be pealed off from the polymer sealing material 110.

With reference to FIG. 6B, presented is a device structure step 608 that is performed after the device structure step 606 shown in FIG. 6A. At the device structure step 608, the releasable handler layer 108 can be fully removed from the polymer sealing material 110.

At a device structure step 610, a laser release process can be performed to cut through the polymer sealing material 110 and the substrate layer 106. In an aspect, the laser release process can cut through the polymer sealing material 110 and the substrate layer 106 to separate the solid-state microbattery component 104a from the solid-state microbattery component 104b. For instance, the laser release process can cut between the solid-state microbattery component 104a and the solid-state microbattery component 104b. The laser release process can also cut through the polymer sealing material 110 and the substrate layer 106 to separate the solid-state microbattery component 104b from the solid-state microbattery component 104c. For instance, the laser release process can cut between the solid-state microbattery component 104b and the solid-state microbattery component 104c. In certain embodiments, the substrate layer 106 can also be removed from the polymer sealing material 110.

Figure 7:
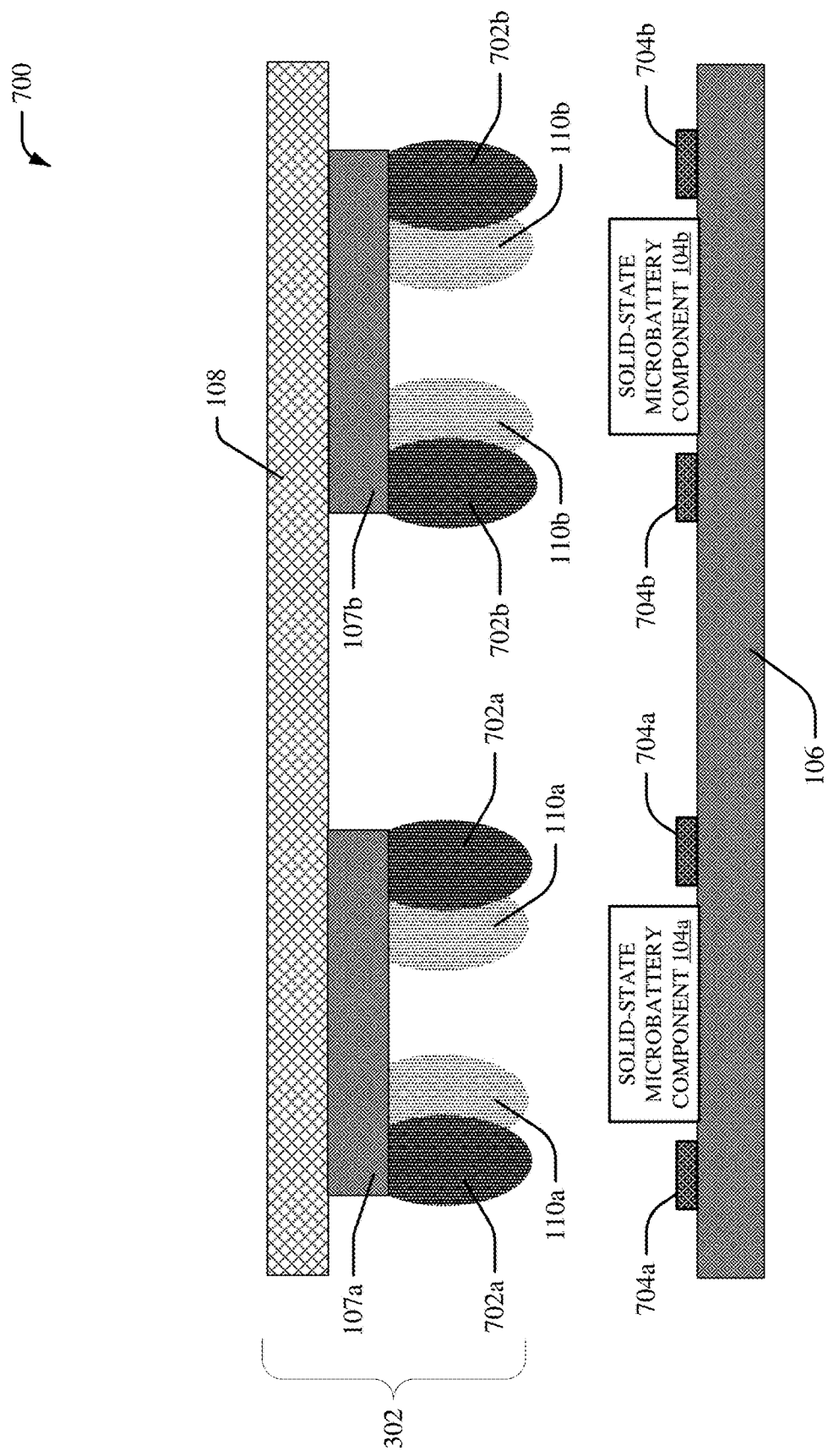
FIG. 7 illustrates a block diagram of yet another example, non-limiting system associated with a solid-state microbattery packaging in accordance with one or more embodiments described herein.

FIG. 7 illustrates a top view of an example, non-limiting system 700 in accordance with one or more embodiments described herein. Repetitive description of like elements employed in other embodiments described herein is omitted for sake of brevity.

The system 700 can be a solid-state microbattery packaging system. For example, the system 700 can be a thin film solid-state microbattery packaging system. The system 700 can include the substrate layer 106, the solid-state microbattery component 104a, the solid-state microbattery component 104b, and the adhesive layer 302. The adhesive layer 302 can include the releasable handler layer 108, the cap wafer 107a, the cap wafer 107b, the polymer sealing material 110a, the polymer sealing material 110b, solder material 702a and solder material 702b. A first surface of the cap wafer 107a and a first surface of the cap wafer 107b can be disposed on the releasable handler layer 108. Furthermore, the polymer sealing material 110a and the solder material 702a can be disposed on a second surface of the cap wafer 107a. The polymer sealing material 110b and the solder material 702b can also be disposed on a second surface of the cap wafer 107b. The solid-state microbattery component 104a and the solid-state microbattery component 104b can be formed on a surface of the substrate layer 106. In an embodiment, the adhesive layer 302 can be bonded to the substrate layer 106 to form a solid-state microbattery packaging system (e.g., to form the system 100 shown in FIG. 1). For instance, the polymer sealing material 110a can be bonded to the solid-state microbattery component 104a and/or the substrate layer 106. The solder material 702a can also be bonded to an electrical terminal 704a associated with the solid-state microbattery component 104a. For example, the electrical terminal 704a can be electrically coupled to the solid-state microbattery component 104a. The solder material 702a can be a fusible metal alloy to facilitate bonding between the cap wafer 107a and the electrical terminal 704a. Furthermore, the polymer sealing material 110b can be bonded to the solid-state microbattery component 104b and/or the substrate layer 106. The solder material 702b can also be bonded to an electrical terminal 704b associated with the solid-state microbattery component 104b. For example, the electrical terminal 704b can be electrically coupled to the solid-state microbattery component 104b. The solder material 702b can be a fusible metal alloy to facilitate bonding between the cap wafer 107b and the electrical terminal 704b.

Figure 8:
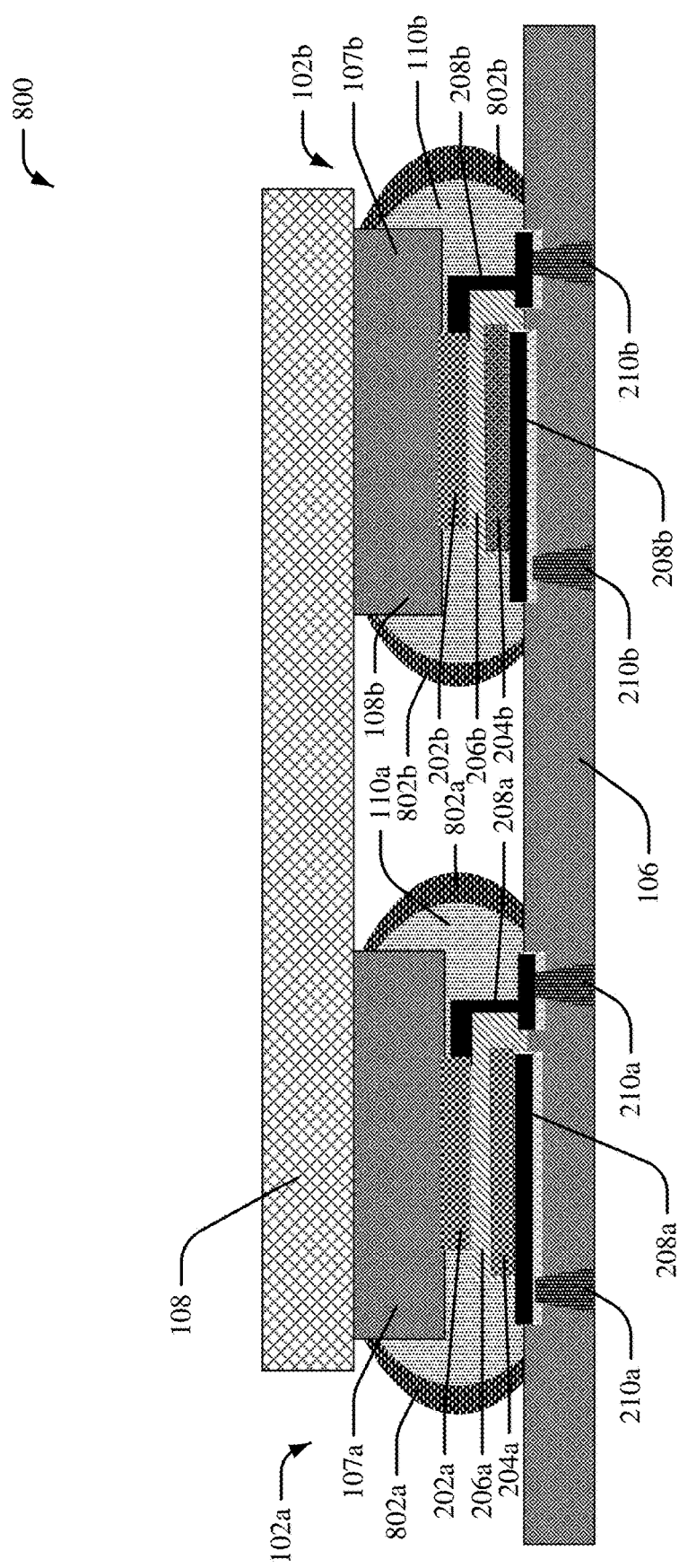
FIG. 8 illustrates a block diagram of yet another example, non-limiting system associated with a solid-state microbattery packaging in accordance with one or more embodiments described herein.

FIG. 8 illustrates a top view of an example, non-limiting system 800 in accordance with one or more embodiments described herein. Repetitive description of like elements employed in other embodiments described herein is omitted for sake of brevity.

The system 800 can be an alternate embodiment of the system 100 and/or the system 100'. In the embodiment shown in FIG. 8, the solid state-microbattery component 104a can correspond to the anode 202a, the cathode 204a, the solid-state electrolyte 206a and/or the one or more conductive traces 208a. Similarly, in the embodiment shown in FIG. 8, the solid state-microbattery component 104b can correspond to the anode 202b, the cathode 204b, the solid-state electrolyte 206b and/or the one or more conductive traces 208b. The system 800 can also include the substrate layer 106, the releasable handler layer 108, the cap wafer 107a, the cap wafer 107b, the polymer sealing material 110a, the polymer sealing material 110b, hermetic coating layer 802a and hermetic coating layer 802b. In an embodiment, the hermetic coating layer 802a can be, for example, a metal layer that comprises a metal material to facilitate bonding between the cap wafer 107a and the substrate layer 106. In another embodiment, the hermetic coating layer 802a can be, for example, a glass layer that comprises a glass material to facilitate bonding between the cap wafer 107a and the substrate layer 106. Alternatively, the hermetic coating layer 802a can be, for example, an insulator layer that comprises an insulator material. Alternatively, the hermetic coating layer 802a can be, for example, a silicon layer that comprises a silicon material. The hermetic coating layer 802a can also create an air-tight seal for the solid-state microbattery component 104a. Similarly, in an embodiment, the hermetic coating layer 802b can be, for example, a metal layer that comprises a metal material to facilitate bonding between the cap wafer 107b and the substrate layer 106. In another embodiment, the hermetic coating layer 802b can be, for example, a glass layer that comprises a glass material to facilitate bonding between the cap wafer 107b and the substrate layer 106. Alternatively, the hermetic coating layer 802b can be, for example, an insulator layer that comprises an insulator material. Alternatively, the hermetic coating layer 802b can be, for example, a silicon layer that comprises a silicon material. The hermetic coating layer 802b can also create an air-tight seal for the solid-state microbattery component 104b. It is to be appreciated that, in certain embodiments, the hermetic coating layer 802a and/or the hermetic coating layer 802b can comprise a different type of material to facilitate a hermetic coating for the solid-state microbattery component 104a and/or the solid-state microbattery component 104b.

The releasable handler layer 108 can be attached to the cap wafer 107a and the cap wafer 107b. Furthermore, the releasable handler layer 108 can be configured to be removable from the cap wafer 107a and the cap wafer 107b. The cap wafer 107a can be, for example, an insulator cap layer. Furthermore, the cap wafer 107b can also be, for example, an insulator cap layer. The cap wafer 107a can be aligned and bonded onto the solid-state microbattery component 104a using the releasable handler layer 108 and/or the polymer sealing material 110a (e.g., adhesive layer 302). Furthermore, the cap wafer 107b can be aligned and bonded onto the solid-state microbattery component 104b using the releasable handler layer 108 and/or the polymer sealing material 110b (e.g., adhesive layer 302). The hermetic coating layer 802a can couple the solid-state microbattery component 104a to the substrate 106. Similarly, the hermetic coating layer 802b can couple the solid-state microbattery component 104b to the substrate 106. In one example, the releasable handler layer 108 can comprise a pressure-sensitive tape. In another example, the releasable handler layer 108 be a dicing tape that comprises polyvinyl chloride, polyolefin, polyethylene or another adhesive material. However, it is to be appreciated that the releasable handler layer 108 can comprise a different type of releasable adhesive material. In an aspect, the releasable handler layer 108 can be a handler layer to facilitate handling of the cap wafer 107a, the cap wafer 107b, the polymer sealing material 110a, the polymer sealing material 110b, the hermetic coating layer 802a and/or the hermetic coating layer 802b. As such, the releasable handler layer 108 can facilitate improved batch transfer and/or bonding of the cap wafer 107a and the cap wafer 107b onto the solid-state microbattery component 104a and the solid-state microbattery component 104b. Furthermore, the releasable handler layer 108 can facilitate improved sealing for the solid-state microbattery component 104a and the solid-state microbattery component 104b. Furthermore, the releasable handler layer 108 can facilitate improved protection of the solid-state microbattery component 104a and the solid-state microbattery component 104b during a shipping process.

Figure 9:
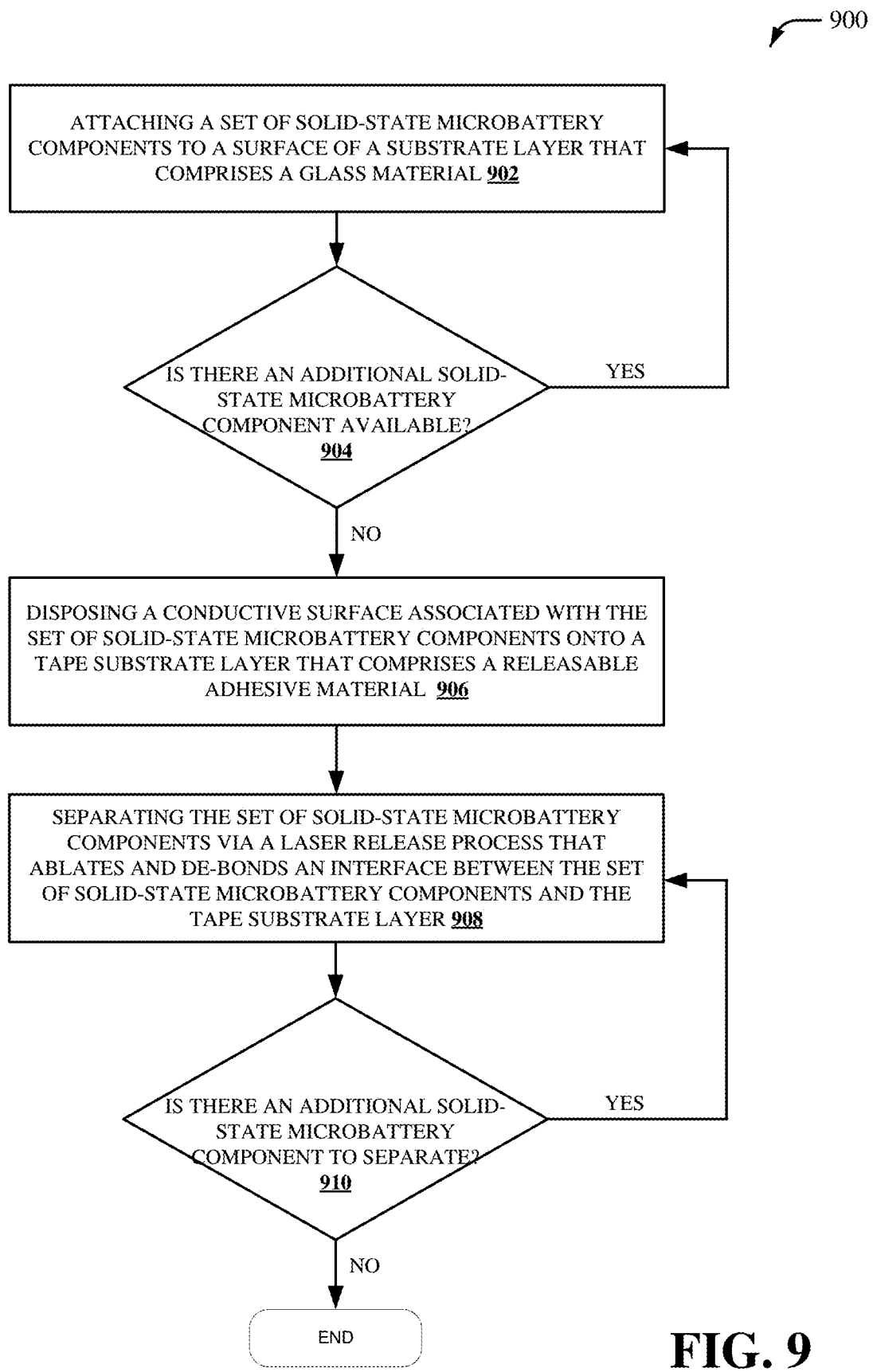
FIG. 9 illustrates a flow diagram of an example, non-limiting method that facilitates fabrication of a solid-state microbattery packaging in accordance with one or more embodiments described herein.

FIG. 9 illustrates a flow diagram of an example, non-limiting method 900 that facilitates fabrication of a solid-state microbattery packaging in accordance with one or more embodiments described herein. Repetitive description of like elements employed in other embodiments described herein is omitted for sake of brevity.

At 902, a set of solid-state microbattery components is attached to a surface of a substrate layer (e.g., substrate layer 106) that comprises a glass material. A solid-state microbattery component from the set of solid-state microbattery components can include, for example, an anode, a cathode and/or a solid-state electrolyte that form a solid-state microbattery. In one example, the set of solid-state microbattery components can be a set of solid-state lithium microbattery component. However, it is to be appreciated that the set of solid-state microbattery components can be a different type of solid-state microbattery components. In an embodiment, the substrate layer can be a device wafer. In certain embodiments, the set of solid-state microbattery components can be arranged on the surface of the substrate layer as an array of solid-state microbattery components on the substrate layer.

At 904, it is determined whether there is an additional solid-state microbattery component available. If yes, method 900 returns to 902 to dispose the additional solid-state microbattery component onto the surface of the substrate layer. If no, method 900 proceeds to 906.

At 906, a conductive surface associated with the set of solid-state microbattery components is disposed onto a tape substrate layer (e.g., releasable handler layer 108) that comprises a releasable adhesive material. The conductive surface can comprise a metal material. In an embodiment, the conductive surface can be a set of cap wafers for the set of solid-state microbattery components. The tape substrate layer can be configured to be removable from the conductive surface associated with the set of solid-state microbattery components. In one example, the tape substrate layer can comprise a pressure-sensitive tape. In another example, the tape substrate layer be a dicing tape that comprises polyvinyl chloride, polyolefin, polyethylene or another adhesive material.

At 908, the set of solid-state microbattery components are separated via a laser release process that ablates and de-bonds an interface between the set of solid-state microbattery components and the tape substrate layer. For example, the laser release process can separate the set of solid-state microbattery components to form individual solid-state microbattery components that are sealed by a polymer sealing material.

At 910, it is determined whether there is an additional solid-state microbattery component to separate. If yes, method 900 returns to 908 to separate the additional solid-state microbattery component from one or more other solid-state microbattery components. If no, method 900 proceeds to end.

In certain embodiments, the method 900 can further comprise disposing a set of cap wafers onto the tape substrate layer. Additionally or alternatively, the method 900 can further comprise disposing a polymer sealing material onto the set of cap wafers on the releasable adhesive material. Additionally or alternatively, the method 900 can further comprise disposing a polymer sealing material onto the set of solid-state microbattery components. Additionally or alternatively, the method 900 can further comprise disposing a polymer sealing material onto the substrate layer.

Figure 10:
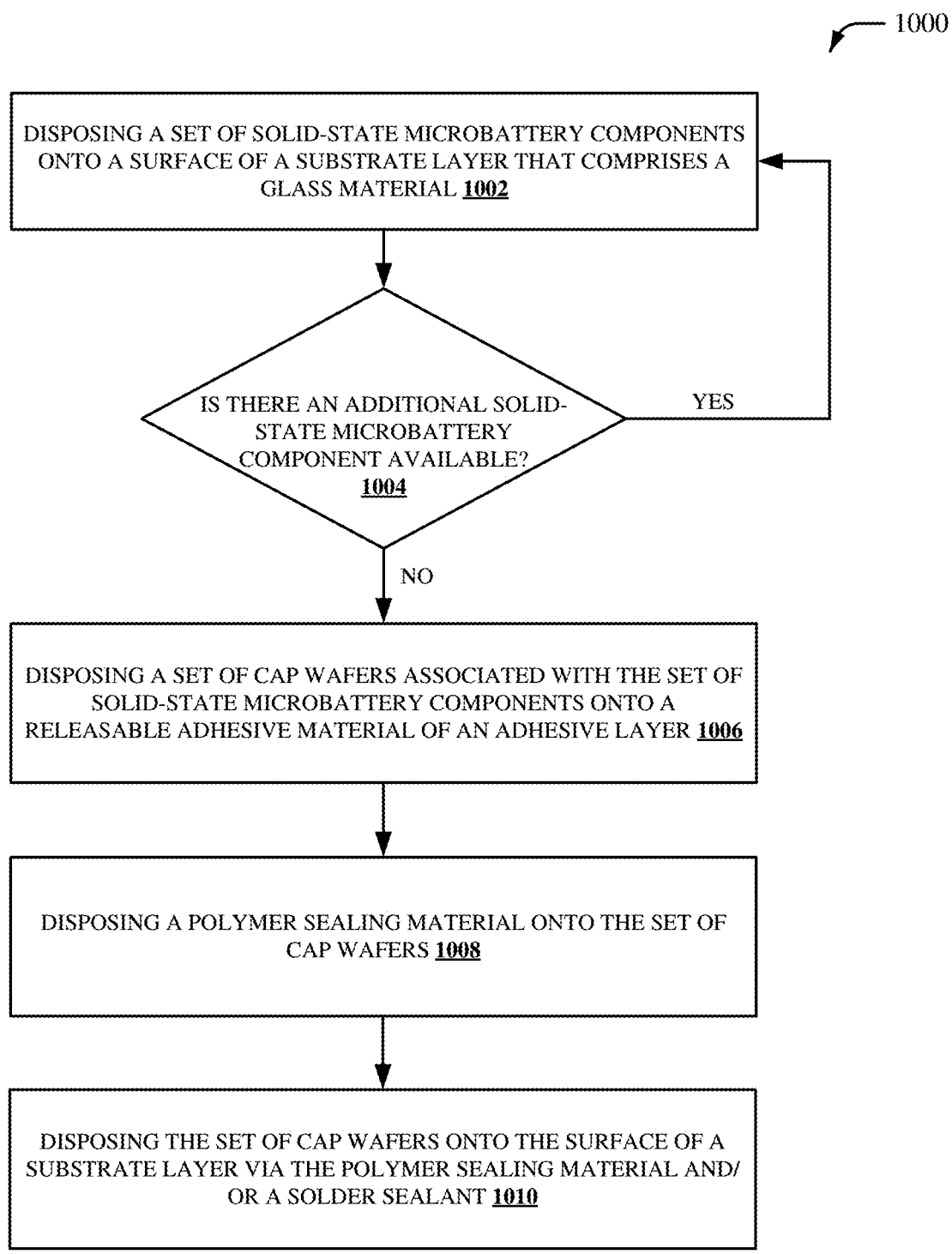
FIG. 10 illustrates a flow diagram of another example, non-limiting method that facilitates fabrication of a solid-state microbattery packaging in accordance with one or more embodiments described herein.

FIG. 10 illustrates a flow diagram of an example, non-limiting method 1000 that facilitates fabrication of a solid-state microbattery packaging in accordance with one or more embodiments described herein. Repetitive description of like elements employed in other embodiments described herein is omitted for sake of brevity.

At 1002, a set of solid-state microbattery components is disposed onto a surface of a substrate layer (e.g., substrate layer 106) that comprises a glass material. A solid-state microbattery component from the set of solid-state microbattery components can include, for example, an anode, a cathode and/or a solid-state electrolyte that form a solid-state microbattery. In one example, the set of solid-state microbattery components can be a set of solid-state lithium microbattery component. However, it is to be appreciated that the set of solid-state microbattery components can be a different type of solid-state microbattery components. In an embodiment, the substrate layer can be a device wafer. In certain embodiments, the set of solid-state microbattery components can be arranged on the surface of the substrate layer as an array of solid-state microbattery components on the substrate layer.

At 1004, it is determined whether there is an additional solid-state microbattery component available. If yes, method 1000 returns to 1002 to dispose the additional solid-state microbattery component onto the surface of the substrate layer. If no, method 1000 proceeds to 1006.

At 1006, a set of cap wafers associated with the set of solid-state microbattery components is disposed onto a releasable adhesive material (e.g., releasable handler layer 108) of an adhesive layer. The set of cap wafers can comprise a metal material associated with the set of solid-state microbattery components. The releasable handler layer can be configured to be removable from the conductive surface associated with the set of solid-state microbattery components. In one example, the releasable handler layer can comprise a pressure-sensitive tape. In another example, the releasable handler layer be a dicing tape that comprises polyvinyl chloride, polyolefin, polyethylene or another adhesive material.

At 1008, a polymer sealing material is disposed onto the set of cap wafers. The polymer sealing material can be, for example, a polymer adhesive to facilitate bonding between the set of cap wafers and the substrate layer. For instance, the polymer sealing material can be a synthetic bonding substance comprised of polymers. The polymer sealing material can also be employed to create an air-tight seal for the set of solid-state microbattery component.

At 1010, the set of cap wafers is disposed onto the surface of a substrate layer via the polymer sealing material and/or a solder sealant. As such, an air-tight seal for the set of solid-state microbattery component can be formed.

Figure 11:
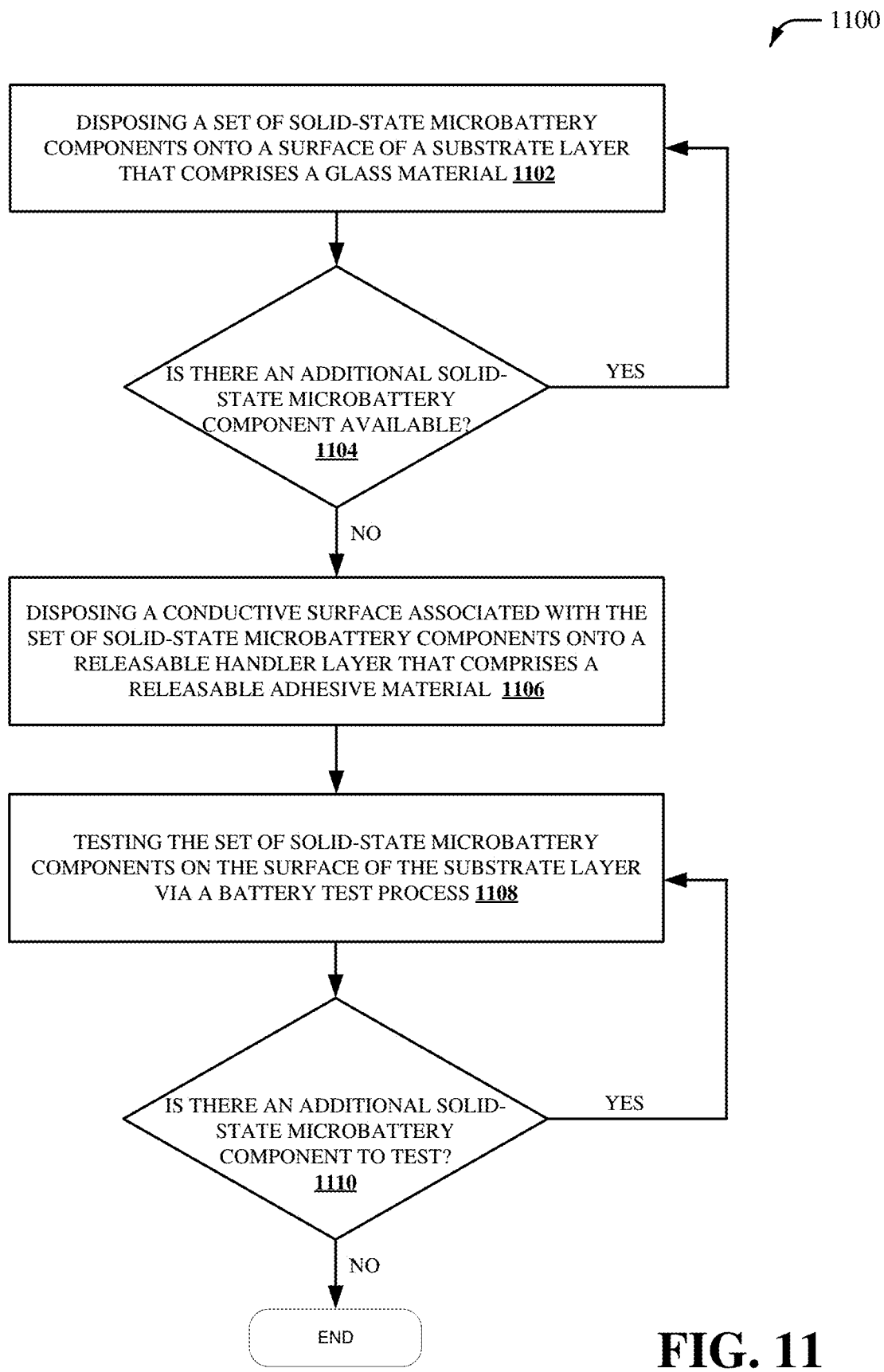
FIG. 11 illustrates a flow diagram of yet another example, non-limiting method that facilitates fabrication of a solid-state microbattery packaging in accordance with one or more embodiments described herein.

FIG. 11 illustrates a flow diagram of an example, non-limiting method 1100 that facilitates fabrication of a solid-state microbattery packaging in accordance with one or more embodiments described herein. Repetitive description of like elements employed in other embodiments described herein is omitted for sake of brevity.

At 1102, a set of solid-state microbattery components is disposed onto a surface of a substrate layer (e.g., substrate layer 106) that comprises a glass material. A solid-state microbattery component from the set of solid-state microbattery components can include, for example, an anode, a cathode and/or a solid-state electrolyte that form a solid-state microbattery. In one example, the set of solid-state microbattery components can be a set of solid-state lithium microbattery component. However, it is to be appreciated that the set of solid-state microbattery components can be a different type of solid-state microbattery components. In an embodiment, the substrate layer can be a device wafer. In certain embodiments, the set of solid-state microbattery components can be arranged on the surface of the substrate layer as an array of solid-state microbattery components on the substrate layer.

At 1104, it is determined whether there is an additional solid-state microbattery component available. If yes, method 1100 returns to 1102 to dispose the additional solid-state microbattery component onto the surface of the substrate layer. If no, method 1100 proceeds to 1106.

At 1106, a conductive surface associated with the set of solid-state microbattery components is disposed onto a releasable handler layer (e.g., releasable handler layer 108) that comprises a releasable adhesive material. The conductive surface can comprise a metal material. In an embodiment, the conductive surface can be a set of cap wafers for the set of solid-state microbattery components. The releasable handler layer can be configured to be removable from the conductive surface associated with the set of solid-state microbattery components. In one example, the releasable handler layer can comprise a pressure-sensitive tape. In another example, the releasable handler layer be a dicing tape that comprises polyvinyl chloride, polyolefin, polyethylene or another adhesive material.

At 1108, the set of solid-state microbattery components on the surface of the substrate layer is tested via a microbattery test process. For example, two or more solid-state microbattery components from the set of solid-state microbattery components can be tested in parallel via the microbattery test process. The microbattery test process can determine whether one or more electrical measurements associated with the set of solid-state microbattery components satisfies a defined criterion. As such, the microbattery test process can determine whether a solid-state microbattery component from the set of solid-state microbattery components should be removed from the substrate layer.

At 1110, it is determined whether there is an additional solid-state microbattery component to test. If yes, method 1100 returns to 1108 to test the additional solid-state microbattery component onto the surface of the substrate layer. If no, method 1100 proceeds to end. In certain embodiments, the method 1100 can comprise removing a solid-state microbattery component from the surface of the substrate layer in response to a determination, based on the microbattery test process, that the solid-state microbattery component satisfies a defined criterion.

For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the methodologies in accordance with the disclosed subject matter. In addition, those skilled in the art will understand and appreciate that the methodologies could alternatively be represented as a series of interrelated states via a state diagram or events. The flowchart and block diagrams in the Figures illustrate the architecture, functionality, and operation of possible implementations of systems, methods, apparatuses and devices according to various embodiments of the present invention. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "electronic device" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, an electronic device and/or a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, electronic devices and/or processors can exploit nano-scale architectures such as, but not limited to, molecular and quantum-dot based transistors, switches and gates, in order to optimize space usage or enhance performance of user equipment. An electronic device and/or a processor can also be implemented as a combination of computing processing units.

What has been described above include mere examples of systems and methods. It is, of course, not possible to describe every conceivable combination of components or methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising:
a substrate layer having a plurality of solid-state microbattery components disposed on a surface of the substrate layer; and
a tape substrate layer that comprises a releasable adhesive material, a first polymer sealing material and a second polymer sealing material, wherein a conductive surface associated with the plurality of solid-state microbattery components is disposed under the releasable adhesive material of the tape substrate layer;
a first cap wafer disposed on a first anode terminal of a first solid-state microbattery component of the plurality of solid-state microbattery components;
a second cap wafer disposed on a second anode terminal of a second solid-state microbattery component of the plurality of solid-state microbattery components, wherein the first cap wafer is a first component and the second cap wafer is a second component, the first cap wafer and the second cap wafer being separate components, and the first polymer sealing material bonds the first cap wafer and the substrate layer, and the second polymer sealing material bonds the second cap wafer and the substrate layer, wherein the second polymer sealing material is separate from the first polymer sealing material.

2. The device of claim 1, wherein the first anode terminal and a first cathode terminal of the first solid-state microbattery component of the plurality of solid-state microbattery components are disposed within the first polymer sealing material of the tape substrate layer, and wherein the second anode terminal and a second cathode terminal of the second solid-state microbattery component of the plurality of solid-state microbattery components are disposed within the second polymer sealing material of the tape substrate layer.

3. The device of claim 1, wherein the first solid-state microbattery component of the plurality of solid-state microbattery components is associated with the first polymer sealing material, which is separate from the second polymer sealing material associated with the second solid-state microbattery component of the plurality of solid-state microbattery components.

4. The device of claim 1, wherein the plurality of solid-state microbattery components are arranged as an array of solid-state microbattery components on the substrate layer.

5. The device of claim 1, wherein each of the plurality of solid-state microbattery components formed on the substrate layer comprises a respective solid-state electrolyte.

6. The device of claim 1, wherein the substrate layer and the tape substrate layer facilitates improved quality of the plurality of solid-state microbattery components.

* * * * *